United States Patent Office 2,977,330
Patented Mar. 28, 1961

2,977,330

CELLULAR POLYALKYLENE - ETHERGLYCOL-ORGANIC DIISOCYANATE REACTION PRODUCT AND METHOD OF PREPARING SAME

Frank M. Brower, Midland, Mich., assignor to The Dow Chemical Company, Midland, Mich., a corporation of Delaware No Drawing. Filed Dec. 5, 1957, Ser. No. 700,754

11 Claims. (Cl. 260—2.5)

This invention relates to vesiculated polymeric products in the molecular structure of which are recurring urethan linkages. More particularly, the invention pertains to cellular or foraminous compositions having predominantly interconnected cells and derived from the polymeric reaction product of certain polyalkylene ether glycols and certain organic diisocyanates and to a method of making the same.

This application is a continuation-in-part of a copending application, Serial No. 378,409, filed September 3, 1953.

It is known that organic substances containing two or more isocyanate groups are capable of reacting with organic substances containing two or more hydroxyl radicals to produce polymeric substances in which the polymer molecules contain recurring urethan linkages resulting from the interreaction of an isocyanate group with an hydroxyl group. This reaction has been applied to simple diols such as ethylene glycol. It has also been applied to diols such as the hydroxy-terminated polyesters, i.e. reaction products of polycarboxylic acids, especially dibasic acids, with diols such as glycols in excess so that the molecules of the resulting polyesters end predominately in hydroxyl groups. For the purpose of making such polymeric materials, the isocyanate compound and the hydroxy-compound are usually reacted in approximately stoichiometric proportions.

It has now been discovered that the polymeric polyurethan reaction products of polyalkylene ether glycols having a molecular weight of at least 500 and a molecular excess of certain organic diisocyanate compounds can be caused to foam by the addition of water in the particular manner set forth hereinafter to produce tough, resilient, spongy products.

An object of this invention is to provide cellular polymeric products, particularly ones in which the polymeric material is a polyurethan.

Another object is to provide such products in which the polyurethan is derived from polyalkylene ether glycols and organic diisocyanates.

A further object is to provide such cellular products wherein the cells are predominantly interconnecting.

Another object is to provide means and method for making such cellular products.

Other objects and advantages of the invention will be apparent in the following description.

The objects of this invention are attained by reacting (a) an organic diisocyanate compound and (b) a polyalkylene ether glycol having an average molecular weight of at least 500, continuing the reaction until the reacting mixture has a viscosity value within a particular range as set forth below, thereupon intimately mixing with such reacting mixture (c) a small amount of water, and allowing the resulting mixture to foam.

The cellular polymeric products thereby resulting are tough, resilient, spongy products having many interconnected cells, which products are elastic and compressible rather than rigid, are readily wettable and are capable of absorbing water like a sponge. These foamed polyurethan compositions contain recurring ether linkages rather than carboxylic ester linkages. The cells in these foamed polyurethan compositions are, for the most part, open and inter-communicating rather than being discrete and isolated. The structure is rubbery and elastic, being compressible yet resilient, the compressed mass returning to the expanded condition when released. The polyurethan compositions are readily wettable by water and aqueous liquids, and readily absorb such liquids into the open, cellular, spongy structure. Other features of the invention will be apparent from the following description.

The particular polyether glycols required by this invention are polyalkylene ether glycols, e.g. polyethylene ether glycol, polypropylene ether glycol and polybutylene ether glycol, having an average molecular weight of at least 500, e.g. from 500 to 10,000. Such polyalkylene ether glycols are commonly obtained by condensation of the corresponding alkylene oxide with water or with the corresponding alkylene glycol or with a lower molecular weight polyalkylene ether glycol, and consist of molecules having recurring alkoxy units and terminated with hydroxyl radicals. Mixed polyalkylene ether glycols, i.e. polyether glycols prepared from mixtures of alkylene oxides, or mixtures of polyaklylene ether glycols can be employed.

While any organic isocyanate compound is capable of reaction with the polyalkylene ether glycols described above, the organic diisocyanate compounds having no other reactive group, i.e. organic compounds having two isocyanate radicals and reactive with hydroxyl radicals only through the isocyanate radicals, are preferred. Such organic diisocyanate compounds can be represented by the formula

O=C=N—R—N=C=O wherein R represents an intervening organic linkage having no substituents, other than the two isocyanate radicals, reactive with hydroxyl radicals. Examples of such organic diisocyanate compounds are the polymethylene diisocyanates, such as hexamethylene diisocyanate and decamethylene diisocyanate, and the aromatic diisocyanates such as phenylene diisocyanate, tolylene diisocyanate and naphthylene diisocyanate. For convenience in mixing with the polyalkylene ether glycols, the organic diisocyanate compounds which are liquid at room temperature are preferred, and tolylene diisocyanate is currently especially preferred because of its commercial availability and price. Mixtures of diisocyanates and mixtures containing diisocyanates and small proportions of polyisocyanates such as 1,2,4-benzenetriisocyanate can also be used.

The relative proportions of the polyalkylene ether glycol and of the organic diisocyanate compound which are admixed in the preparation of the products of this invention are in part dependent on the kind of such reactants employed and in part dependent on the kind of product desired. In general, larger weight proportions of the diisocyanate compound are required for polyalkylene ether glycols of lower molecular weight than are required for polyalkylene ether glycols of higher molecular weight. Larger proportions of diisocyanate compound are required to produce low density foams than are required for less expanded, higher density foams. In general, larger proportions of diisocyanate compound give rise to firmer foams while, conversely, lesser proportions of diisocyanate compound give rise to softer, less resilient foams. Preferably, the amount of the starting organic diisocyanate compound that is employed corresponds to at least two molecular proportions thereof per molecular proportion of the polyalkylene ether glycol starting material, and further corresponds to from 15 to 50 percent by weight of the starting mixture of the organic diisocyanate compound and the polyalkylene ether glycol.

The method of making the foamed products of this invention comprises admixing and interacting the polyalkylene ether glycol and the organic diisocyanate compound and subsequently dispersing water into the reacting mixture. The polyalkylene ether glycol and the organic diisocyanate compound are preferably mixed at room temperature although the mixture may be warmed if desired. In the absence of cooling, heat generated by the reaction usually causes the temperature of the mixture to rise as the reaction takes place. The temperature can be allowed to rise to about 100° C. or above, or cooling means can be employed if desired to limit the rise in temperature and to moderate the vigor of the reaction.

In many instances, the starting polyalkylene ether glycol and organic diisocyanate compound interact readily upon being intermixed. In instances where the reaction is sluggish, the rate of reaction can be increased by heating the reacting mixture, or catalysts can be added to accelerate the reaction. Suitable catalysts for use in accelerating the interaction of the starting polyalkylene ether glycol and organic diisocyanate compound are exemplified by the inorganic strong bases or base-forming materials such as the alkali hydroxides, e.g. sodium hydroxide and potassium hydroxide, alkali oxides, e.g. sodium peroxide, alkali salts of weak acids, e.g. sodium acetate and potassium oleate, and alkali alkoxides, e.g. sodium methoxide and sodium ethoxide, organic bases, particularly tertiary amines such as pyridine, N-methylmorpholine, and triethylamine, and peroxides such as methyl ethyl ketone peroxide, benzoyl peroxide, and hydrogen peroxide. Depending upon the efficacy of the catalyst and the degree of activation desired, the catalysts can be advantageously employed in small proportion, e.g. up to 5 percent by weight of the reaction mixture.

It has been found that treatment of the polyalkylene ether glycol with a catalytic amount of sodium peroxide prior to admixture with the diisocyanate compound is especially advantageous in accelerating the reaction and improving the quality of the foamed product without exerting any deleterious effect thereon. The treatment is usually carried out by mixing into the polyalkylene ether glycol a minor catalytic amount, e.g. up to about 5 percent by weight of the polyalkylene ether glycol, of sodium peroxide and preferably heating the mixture to a temperature of about 80°–90° C. for a short time, e.g. up to about 30 minutes, and thereafter cooling again to room temperature. It is not known with certainty what chemical reactions, if any, occur during such treatment, but polyalkylene ether glycols so treated are remarkably activated for reaction with organic diisocyanate compounds. However, the treatment with sodium peroxide as just described is not essential. Polyalkylene ether glycols can be used in accordance with this invention without any catalyst, or another of the catalysts hereinbefore described can be used to produce the novel cellular polyurethan products.

The organic diisocyanate compound and the polyalkylene ether glycol are mixed with stirring to effect prompt and intimate intermingling of the reactants. With many polyalkylene ether glycols, e.g. ones activated by catalysts such as sodium peroxide as described above, the reaction with the organic diisocyanate compound proceeds rapidly with evolution of heat and increase in viscosity of the reaction mixture. Continued stirring is desirable, although the vigor of agitation may be decreased after thorough mixing of the reactants has been effected.

During a period of from a few minutes to several hours or more, depending upon the rate of reaction, the viscosity of the reacting mixture increases until the reaction mixture resembles a heavy syrup. The reaction is allowed to proceed until the viscosity of the reacting mixture is in the range from about 4000 to about 20,000 centipoises, particularly from 4000 to 16,000 centipoises when the rate of reaction is relatively fast and from 8000 to 20,000 centipoises when the rate of reaction is relatively slow, preferably from 8000 to 16,000 centipoises, whereupon a small amount of water is added to the reacting mixture and thoroughly and intimately mixed therewith, and the resulting mixture is allowed to foam.

A syrupy reacting mixture having a viscosity within the above-specified range is most advantageously treated with water to effect foaming thereof. If water is added to the reacting mixture when the viscosity is less than was just defined (e.g. below 4000 centipoises when the reaction is relatively fast or below 8000 centipoises when the reaction is relatively slow), the gaseous carbon dioxide that is generated escapes too readily from the mixture without forming a stable cellular structure. Any foams that do result thereby are transitory and generally collapse to substantially non-cellular masses. Moreover, the resulting products are usually sticky masses. If the addition of water is deferred until the viscosity of the reacting mixture is greater than the range above defined (e.g. above 16,000 centipoises when the reaction is relatively fast or above 20,000 centipoises when the reaction is relatively slow), it is very difficult if not impossible to obtain intimate mixing of water with the reacting mixture, and the resulting cellular product, if one be obtained, is generally non-uniform and of poor quality.

The proportion of water added to the reacting polyurethan mixture should correspond to at least one mole, preferably from one to two moles, of water per mole of unreacted organic diisocyanate in that reacting mixture, but should be not more than about 20, preferably not more than 15, percent by weight of the polyurethan reaction mixture.

The added water should promptly be thoroughly and intimately mixed with the syrupy reaction mixture by vigorous agitation. Foaming begins at once and agitation is preferably discontinued immediately after the water has been dispersed in the mixture. During the foaming step, the viscosity of the mass increases, probably as a consequence of further chain lengthening and increase in the molecular weight of the polymer molecules with the formation of disubstituted urea bridges or linkages. The mass also gels, probably by cross-linking of the molecular structure. Expansion of the foam is usually complete in a few minutes.

The properties of the resulting vesiculated polymeric polyurethans depend largely on the kind and proportion of polyalkylene ether glycol and organic diisocyanate compound which were interacted. In general, the products are low-density materials having many small, open, inter-connected cells. They are generally non-rigid, elastic, resilient materials resembling sponge rubber. They readily absorb large quantities of water. Products made from polyalkylene ether glycols of higher molecular weight (requiring less organic diisocyanate compound) are usually softer and more resilient than products made from lower molecular weight polyalkylene ether glycols.

Products made from polyethylene ether glycols, particularly those of molecular weight above about 500, are soft, elastic foams. However, unlike the polypropylene ether glycol products described below, the polyethylene ether glycol products are not stable to water. For example, a polyethylene ether glycol of molecular weight about 600 reacted with an excess of m-tolylene diisocyanate and foamed with water produces a soft, resilient, low-density spongy foam which readily absorbs water; in contact with water, especially hot water, the mechanical structure of the polyethylene ether glycol product disintegrates. Such products are particularly adapted for use in mechanical structures as low-density, resilient holding or spacing members which are readily removed when desired by contact with water, or as readily disposable cleaning aids, e.g. as scrubbing pads for cleaning toilet bowls.

Products made from polypropylene ether glycols, particularly those whose molecular weight is above about 500, are also soft, elastic foams. Moreover, these products are resistant to deleterious attack by water and aqueous solutions. For example, a polypropylene ether glycol of molecular weight about 750 reacted with an excess of m-tolylene diisocyanate and foamed with water produces a soft, resilient, low-density spongy foam which readily absorbs water but which is unaffected by boiling water. Such products are particularly adapted for use as washing sponges or as resilient, low-density fillers, cushions, in shock and sound dampening, and the like.

Products made from polybutylene ether glycols and higher polyalkylene ether glycols are more firm and less elastic than those made from polypropylene ether glycols while yet readily absorbing water and being unaffected thereby.

Therefore, by selection of the kind of polyalkylene ether glycol, the molecular weight of the polyalkylene ether glycol, the proportion of organic diisocyanate compound reacted therewith and the conditions of foaming, there can be obtained foamed products varying in texture from soft to firm, and differing from one another in density, resiliency and resistance to water.

Further modifications of the compositions of this invention can be made. For example, a minor amount of a polyhydric compound such as glycerol or trimethylol propane can be added to the polyalkylene ether glycol to provide a slight amount of cross-linking during the reaction with the organic diisocyanate compound thereby making a tougher foam structure. A minor amount, e.g. up to about 10 percent by weight, of a fibrous reinforcing material, such as short length polyamide fiber, polyester fiber, cellulosic fiber or the like, can be mixed with the polyalkylene ether glycol and thereby incorporated in the foamed product increasing its resistance to tearing and abrasion. Minor amounts of coloring materials, fillers, abrasive agents, detergents and the like can similarly be incorporated in the foamed polymeric polyurethan resins if desired.

The invention will now be illustrated by examples, which should not be construed as limiting the invention, in which compositions by parts and percentages are by weight unless otherwise indicated.

EXAMPLE 1

A polypropylene ether glycol having an average molecular weight of about 2000 was heated at a temperature of 80° C. with 0.5 percent of its weight of sodium peroxide for a period of several minutes and thereafter was cooled to room temperature. Twelve grams of the polypropylene ether glycol so treated and four grams of m-tolylene diisocyanate were then stirred together. The temperature of the reaction mixture rose gradually and the viscosity of the mixture increased. About 10 minutes after mixing the reactants, the viscosity having increased to that of a heavy syrup and judged to be between 8000 and 16,000 centipoises, one milliliter of water was quickly stirred into the reaction mixture and stirring was stopped. The mass began at once to foam and after a few minutes was a firm, low-density, resilient foraminous material. It was easily compressed and promptly re-expanded upon release of pressure. The spongy product readily absorbed water which was easily squeezed out. The sponge product was unaffected by boiling water.

In this instance, the amount of water employed corresponded to slightly more than 6 percent of the weight of the polyurethan reaction mixture. In other tests, an amount of water was used that corresponded to from a minimum of one mole of water per mole of unreacted organic diisocyanate in the reaction mixture to a maximum of approximately 20 percent of the weight of the polyurethan reaction mixture to produce the cellular products of this invention.

In place of the m-tolylene diisocyanate employed in the foregoing example, there can be used another of the organic diisocyanates hereinbefore described with substantially the same results, i.e. formation of cellular products having predominantly interconnecting cells.

In place of the particular polyalkylene ether glycol used in the foregoing example, there can be used other polyalkylene ether glycols, as illustrated in later examples.

While the pre-treatment of the polyalkylene ether glycol with sodium peroxide is of interest in activating a very fast reaction of the polyalkylene ether glycol and the organic diisocyanate, such pretreatment is not essential and can be omitted. The polyalkylene ether glycol-organic diisocyanate reaction can be carried out without any catalyst, or diverse catalysts therefor can be employed, and the cellular products of this invention can be obtained, provided the other conditions of this invention are met as herein described.

EXAMPLE 2

Twelve-gram portions of polypropylene ether glycol of average molecular weight about 2000, activated by treatment with 0.5 percent by weight sodium peroxide as described in Example 1, were separately reacted with different amounts of m-tolylene diisocyanate and foamed by addition thereto of 1-ml. portions of water as described in Example 1 to make foamed products identified as A through G in Table I. In the table are shown the proportions of m-tolylene diisocyanate used in making each foam in terms of the percentage of m-tolylene diisocyanate in the reaction mixture thereof with the polypropylene ether glycol. In each instance, the viscosity of the reacting mixture was judged to be between 8000 and 16,000 centipoises at the time of the addition of water. The table also shows the densities of the foams, and remarks are made regarding the texture of the products.

*Table I*

| Foam | m-Tolylene diisocyanate, percent | Density of Foam, gm./cc. | Remarks |
| --- | --- | --- | --- |
| A | 15 | 0.35 | very soft; poor elasticity. |
| B | 20 | 0.27 | soft; good elasticity. |
| C | 25 | 0.22 | Do. |
| D | 29 | 0.13 | medium soft; good elasticity. |
| E | 35 | 0.13 | firm; good elasticity. |
| F | 40 | 0.12 | Do. |
| G | 50 | 0.11 | Do. |

EXAMPLE 3

To twelve grams of polypropylene ether glycol having an average molecular weight of about 2000 and activated with 0.5 percent of its weight of sodium peroxide as described in Example 1 was added 0.5 gram of fine polyethylene terephthalate fibers cut to lengths of ⅛ to ¼ inch. Four grams of m-tolylene diisocyanate was then stirred in. Stirring was continued until a very viscous, heavy syrupy condition was attained, the viscosity being estimated as about 16,000 centipoises, whereupon one milliliter of water was thoroughly mixed in and stirring was discontinued. A soft, tough, resilient low-density foam was obtained.

EXAMPLE 4

Seven grams of polyethylene ether glycol having an average molecular weight of about 600 (and having received no activation treatment with sodium peroxide) and three grams of m-tolylene diisocyanate were mixed and reacted until a viscous mixture was obtained whose viscosity was judged to be between 8000 and 16,000 centipoises, whereupon two drops of water were added and thoroughly admixed with the reacting mixture. A soft, elastic foam was produced which disintegrated on standing immersed in water.

EXAMPLE 5

A high molecular weight polybutylene ether glycol was heated with 0.5 percent of its weight of sodium peroxide at a temperature of 80°–90° C. for a few minutes and thereafter was cooled to room temperature. Two grams of the polybutylene ether glycol so treated, four grams of the untreated polybutylene ether glycol and four grams of m-tolylene diisocyanate were mixed with stirring. After nine minutes the viscosity had become that of a heavy syrup corresponding to between 8000 and 16,000 centipoises. One milliliter of water was thereupon thoroughly mixed in and stirring was stopped. A firm foam was obtained which, while somewhat elastic, was less elastic than those obtained from polypropylene ether glycol.

EXAMPLE 6

In a series of tests identified as tests H–P, several polyalkylene ether glycol starting materials were mixed with m-tolylene diisocyanate and allowed to react. In Table II, the kind of starting polyalkylene ether glycols and the amounts thereof and of the m-tolylene diisocyanate (TDI) in the reaction mixture are shown for each test. In tests H and I, no catalyst of any kind was employed. In tests J through N, the indicated diverse kinds of catalysts were added to the mixture of polyalkylene ether glycol and m-tolylene diisocyanate. In tests O and P, the starting polyalkylene ether glycol was pretreated by heating with the indicated catalysts at 100° C. for 15 minutes, after which the resulting products were cooled to room temperature and mixed with the m-tolylene diisocyanate. In tests H, I, K, and L the mixtures of polyalkylene ether glycol and m-tolylene diisocyanate were heated at 100° C. for the times indicated before adding the water. In the other tests shown, the reacting mixtures were allowed to stand at room temperature, i.e. between 25° and 30° C. Since these reactions are exothermic, slight spontaneous warming occurred in all instances. In the case of the very fast reaction in test O, the mixture self-warmed to about 60° C.

At the indicated times, the viscosities of the reacting mixtures were judged to be in the range from 8000 to 16,000 centipoises. At these times, the indicated amounts of water were added to the reacting mixtures and thoroughly and intimately mixed therewith, after which the reaction mixtures were allowed to foam.

In each instance, the resulting foamed products were resilient, open-celled cellular products which readily absorbed water.

2000, catalyzed by treatment with sodium peroxide) and 25 milliliters of m-tolylene diisocyanate was prepared. The viscosity of the reaction mixture was measured with a Brookfield "Synchro-Lectric" Viscometer, using the No. 3 spindle rotating at 6 r.p.m. (revolutions per minute). When the viscoscity reached 4000 centipoises (Temperature about 60° C), 20 milliliters of water was added and thoroughly mixed into the reacting mixture. The resulting mixture foamed to a spongy, resilient, open-celled structure.

The above test was then substantially repeated, but the viscosity of the reaction mass was allowed to rise above 4000 centipoises. From time to time, samples of the reacting mixture were removed from the reaction vessel and were separately mixed with small amounts of water and were allowed to foam. Samples were taken at viscosity values of 6000; 7200; 11,400; 13,800; and 17,000 centipoises, respectively. In each instance good, open-celled, foamed products were obtained.

In another test, a slow-reacting mixture was prepared from 80 milliliters of polypropylene ether glycol (molecular weight 2000, lightly catalyzed by treatment with a trace of sodium peroxide) and 25 milliliters of m-tolylene diisocyanate. The viscosity of the slowly reacting mixture gradually rose while the temperature of the reacting mixture remained at about room temperature. When the viscosity of the reacting mixture reached 20,000 centipoises, 20 milliliters of water was mixed in and the resulting mixture was allowed to foam. The resulting cellular product was a resilient sponge having predominantly interconnected cells.

In other tests, it was found that the viscosity range of from 4000 to 20,000 centipoises in the reacting mixture was critical for the purposes of this invention. When the viscosity of the reacting mixture of polyalkylene ether glycol and organic diisocyanate was appreciably greater than 20,000 centipoises, the intimate addition and mixing of water was no longer possible. The resulting products were generally non-cellular or were non-uniform; the cells, if any, were usually closed, non-communicating cells. In instances of fast-reacting mixtures, the maximum convenient limit of viscosity was in the order of 16,000 centipoises.

On the other hand, it was found that the minimum viscosity of the reaction mixtures that produced the products of this invention was about 4000 centipoises. When water was admixed with the reacting mixture at viscosities appreciably below 4000 centipoises, the foamed

*Table II*

| Test | Polyalkylene Ether Glycol | TDI, ml. | Catalyst | Temp., ° C. | Time | Water, ml. |
| --- | --- | --- | --- | --- | --- | --- |
| H | Polypropylene ether glycol, M.W. 2,000, 10 ml. | 5 | none | 100 | 5.5 days | 2 |
| I | Polypropylene, ether glycol, M.W. 2,000, 10 ml.; M.W. 400, 5 ml. | 7 | do | 100 | 2 hours | 2 |
| J | Polypropylene ether glycol, M.W. 2,000, 10 ml. | 5 | Potassium oleate, trace | Room Temp. | 4 hours | 2 |
| K | do | 5 | Triethyl amine, 0.5 ml | 100 | 2.25 hours | 2 |
| L | do | 5 | N-Methyl morpholine, 1 ml | 100 | 2 hours | 2 |
| M | Polypropylene ether glycol, M.W. 2,000, 20 ml. | 10 | Methyl ethyl ketone peroxide, 1.3 ml. (Note 1). | Room Temp. | 4 days | 2 |
| N | Polypropylene ether glycol, M.W. 2,000, 10 ml. | 5 | Hydrogen Peroxide 30 percent, 3 drops. | do | 3 days | 3 |
| O | Polybutylene ether glycol, M.W. 1,000, 10 ml. | 5 | Potassium hydroxide, Trace (Note 2). | ca. 60 | 2 mins | 2 |
| P | Polypropylene ether glycol, M.W. 2,000, 20 ml. | 10 | Sodium metal, Trace (Note 2) | Room Temp. | 2.6 hours | 3 |

Note 1: 60 percent solution in dimethyl phthalate.
Note 2: Polyalkylene ether glycol pretreated with catalyst before addition of m-tolylene diisocyanate.

EXAMPLE 7

A number of tests were carried out in which the viscosity of the reacting mixture of polyalkylene ether glycol and organic diisocyanate was measured at the time of addition thereto of water.

In one such test, a fast-reacting mixture of 80 milliliters of polypropylene ether glycol (molecular weight products usually at least partially collapsed, and the resulting products were usually tacky. In instances of slow-reacting mixtures, it was found preferable to allow the reaction to proceed until the viscosity of the reacting mixture was at least 6000, preferably between 8000 and 20,000 centipoises before adding water thereto.

That which is claimed is:

1. A method of making a foraminous polyurethan composition having predominantly interconnecting cells, which method comprises reacting (a) an organic diisocyanate compound in which the two isocyanate radicals are the only groups reactive with hydroxyl radicals and (b) a polyalkylene ether glycol having an average molecular weight of from 500 to 10,000, the organic diisocyanate compound being present in amount corresponding to from 15 to 50 percent by weight of the resulting mixture of (a) and (b) and to at least two moles thereof per mole of the polyalkylene ether glycol, continuing the reaction between the polyalkylene ether glycol and the organic diisocyanate compound until the viscosity of the reacting mixture corresponds to from 4000 to 20,000 centipoises, thereupon intimately mixing with the reacting mixture, while the viscosity thereof corresponds to from 4000 to 20,000 centipoises, (c) water in an amount corresponding to at least one mole thereof per mole of unreacted organic diisocyanate compound in the reacting mixture and to not more than 20 percent by weight of the reacting mixture, and allowing the resulting reaction mixture to foam.

2. A method according to claim 1 wherein the polyalkylene ether glycol is a polyethylene ether glycol and the organic diisocyanate compound is m-tolylene diisocyanate.

3. A method according to claim 1 wherein the polyalkylene ether glycol is a polypropylene ether glycol and the organic diisocyanate compound is m-tolylene diisocyanate.

4. A method according to claim 1 wherein the polyalkylene ether glycol is a polybutylene ether glycol and the organic diisocyanate compound is m-tolylene diisocyanate.

5. A method of making a foraminous polyurethan composition having predominantly interconnecting cells, which method comprises reacting (a) an organic diisocyanate compound in which the two isocyanate radicals are the only groups reactive with hydroxyl radicals and (b) a polyalkylene ether glycol having an average molecular weight of from 500 to 10,000, which polyalkylene ether glycol has been activated prior to use in this method by heating with up to 5 percent of its weight of sodium peroxide when the alkylene radicals of the polyalkylene ether glycol are larger than ethylene radicals, the organic diisocyanate compound being present in amount corresponding to from 15 to 50 percent by weight of the resulting mixture of (a) and (b) and to at least two moles thereof per mole of the polyalkylene ether glycol, continuing the reaction between the polyalkylene ether glycol and the organic diisocyanate compound until the viscosity of the reacting mixture corresponds to from 8000 to 16,000 centipoises, thereupon intimately mixing with the reacting mixture, while the viscosity thereof corresponds to from 8000 to 16,000 centipoises, (c) water in an amount corresponding to at least one mole thereof per mole of unreacted organic diisocyanate compound in the reacting mixture and to not more than 20 percent by weight of the reacting mixture, and allowing the resulting reaction mixture to foam.

6. A method according to claim 5 wherein the polyalkylene ether glycol is a polyethylene ether glycol and the organic diisocyanate compound is m-tolylene diisocyanate.

7. A method according to claim 5 wherein the polyalkylene ether glycol is a polypropylene ether glycol and the organic diisocyanate compound is m-tolylene diisocyanate.

8. A method according to claim 5 wherein the polyalkylene ether glycol is a polybutylene ether glycol and the organic diisocyanate compound is m-tolylene diisocyanate.

9. A foraminous article having predominantly interconnecting cells the walls of which consist essentially of a polyurethan condensation polymer having recurring urethan linkages formed by reaction of reactants consisting of a polyalkylene ether glycol having an average molecular weight of from 500 to 10,000 and wherein the alkylene groups comprise substantially from 3 to 4 carbon atoms and an organic diisocyanate compound in which the two isocyanate radicals are the only groups reactive with hydroxyl radicals, the organic diisocyanate compound being used in amount corresponding to from 15 to 50 percent by weight of the reactants and to at least two moles thereof per mole of the polyalkylene ether glycol, the cells having been formed by further reaction of the polyurethan polymer containing unreacted organic diisocyanate with water in amount corresponding to at least one mole thereof per mole of unreacted organic diisocyanate and to not more than 20 percent by weight of the polymer-diisocyanate mixture, the water being intimately admixed with the reacting mixture of polyalkylene ether glycol and organic diisocyanate while the viscosity of said reacting mixture corresponds to from 4000 to 20,000 centipoises.

10. A foraminous article having predominantly interconnecting cells according to claim 9 wherein the polyalkylene ether glycol is a polypropylene ether glycol, and the organic diisocyanate compound is m-tolylene diisocyanate.

11. A foraminous article having predominantly interconnecting cells according to claim 9 wherein the polyalkylene ether glycol is a polybutylene ether glycol, and the organic diisocyanate compound is m-tolylene diisocyanate.

References Cited in the file of this patent

UNITED STATES PATENTS

| | | |
|---|---|---|
| 2,284,637 | Catlin | June 2, 1942 |
| 2,692,873 | Langerak et al. | Oct. 26, 1954 |
| 2,726,219 | Hill | Dec. 6, 1955 |
| 2,780,350 | Simon et al. | Feb. 5, 1957 |
| 2,871,227 | Walter | Jan. 27, 1959 |

UNITED STATES PATENT OFFICE
CERTIFICATION OF CORRECTION

Patent No. 2,977,330                                  March 28, 1961

Frank M. Brower

It is hereby certified that error appears in the above numbered patent requiring correction and that the said Letters Patent should read as corrected below.

Column 8, line 3, for "reaction" read -- reacting --; column 9, lines 6 and 40, after "10,000", each occurrence, insert -- and wherein the alkylene groups comprise from 3 to 4 carbon atoms --; same column 9, line 22, beginning with "2. A method according", strike out all to and including "cyanate." in line 25, same column; column 10, line 4, beginning with "6. A method according", strike out all to and including "cyanate." in line 7, same column; line 22, strike out "substantially"; columns 9 and 10, for the claims numbered "3, 4, 5, 7, 8, 9, 10, and 11" read -- 2, 3, 4, 5, 6, 7, 8, and 9 --; column 10, lines 8 and 12, for the claim reference numeral "5", each occurrence, read -- 4 --; lines 40 and 45, for the claim reference numeral "9", each occurrence, read -- 7 --; in the heading to the printed specification, line 9, for "11 Claims" read -- 9 Claims --.

Signed and sealed this 28th day of November 1961.

(SEAL)
Attest:

ERNEST W. SWIDER                                    DAVID L. LADD
Attesting Officer                                Commissioner of Patents